US007284034B2

(12) United States Patent
Matsa et al.

(10) Patent No.: US 7,284,034 B2
(45) Date of Patent: Oct. 16, 2007

(54) TRANSPARENT COMBINATION OF INSTANT MESSAGE PROTOCOLS

(75) Inventors: Moshe E. Matsa, Cambridge, MA (US); Julius Q. Quiaot, San Jose, CA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/193,632

(22) Filed: Jul. 11, 2002

(65) Prior Publication Data
US 2002/0178231 A1 Nov. 28, 2002

Related U.S. Application Data

(63) Continuation-in-part of application No. 09/866,410, filed on May 25, 2001.

(51) Int. Cl.
G06F 15/16 (2006.01)
(52) U.S. Cl. .................. 709/206; 709/203; 709/223
(58) Field of Classification Search ........... 709/203, 709/205–206, 217, 219, 223–224, 229, 237
See application file for complete search history.

(56) References Cited

U.S. PATENT DOCUMENTS

| | | | | |
|---|---|---|---|---|
| 5,796,394 A * | 8/1998 | Wicks et al. | ............... | 715/751 |
| 6,012,084 A * | 1/2000 | Fielding et al. | ............ | 709/205 |
| 6,075,844 A * | 6/2000 | Goldberg et al. | ........ | 379/88.17 |
| 6,147,977 A * | 11/2000 | Thro et al. | ................ | 370/265 |
| 6,175,859 B1 * | 1/2001 | Mohler | ...................... | 709/206 |
| 6,260,148 B1 * | 7/2001 | Aggarwal et al. | ........... | 726/14 |
| 6,301,609 B1 * | 10/2001 | Aravamudan et al. | ...... | 709/207 |
| 6,350,066 B1 * | 2/2002 | Bobo, II | ................... | 709/206 |
| 6,430,604 B1 * | 8/2002 | Ogle et al. | ................. | 709/207 |
| 6,691,162 B1 * | 2/2004 | Wick | ......................... | 709/224 |
| 6,771,756 B1 * | 8/2004 | Chou et al. | ........... | 379/201.01 |
| 6,993,564 B2 * | 1/2006 | Whitten, II | ............... | 709/207 |
| 2002/0120687 A1 * | 8/2002 | Diacakis et al. | ........... | 709/204 |

(Continued)

OTHER PUBLICATIONS

U.S. Appl. No. 09/866,410, filed May 25, 2001, Matsa et al.

(Continued)

*Primary Examiner*—Ario Etienne
*Assistant Examiner*—LaShonda Jacobs
(74) *Attorney, Agent, or Firm*—John E. Campbell; Jose Gutman; Fleit Kain Gibbons Gutman Bongini & Bianco P.L.

(57) ABSTRACT

A system and method for routing instant messages uses a user presence service to aid a user in determining to send an instant message to an intended recipient based on user availability information. The method also uses a configurable delivery manager that defines, at runtime, a delivery policy to be used to route the instant message to an intended recipient of the message. The delivery policy is based upon a configuration of the delivery manager, a user configuration of the intended recipient, and one or more available delivery mechanisms. The delivery manager is configured by means of an ordered list of one or more available delivery mechanisms. The delivery manager routes the instant message by dispatching the message by selecting sequential delivery mechanisms, in the order of appearance on the ordered list, until the user presence service indicates the intended recipient is available using the selected delivery mechanism.

22 Claims, 12 Drawing Sheets

U.S. PATENT DOCUMENTS

2002/0160757 A1* 10/2002 Shavit et al. ............... 455/414
2003/0046421 A1* 3/2003 Horvitz et al. .............. 709/238

OTHER PUBLICATIONS

Eng, Paul "SIMPLE Chats—New Standard to Make Instant Messaging Universal," abcNEWS.com, Aug. 24, 2001, ABCNEWS.com: Simplifying Instant Messaging, wysiwyg://18/http://abcnews.gc.com/sect...tech/CuttingEdge/cuttingedge010824.html.

Fong, A.C.M.; Hui, S.C.; Lau, C.T., "Towards An Open Protocol For Secure Online Presence Notification," Computer Standards & Interfaces, vol. 23, No. 4, pp. 311-324, Sep. 2001, Netherlands, Abstract Only.

* cited by examiner

*300*

| INSTANT MESSAGE | |
|---|---|
| USER NAME | JOHN SMITH |
| BODY | HELLO, JOHN. |
| PROPERTIES | PRIORITY = NORMAL<br>EXPIRES = CURRENT_TIME+3600 |

302 → USER NAME row
304 → BODY row
306 → PROPERTIES row

```
      DELIVERY MANAGER DATABASE
    ┌─────────────────────────────┐
    │   DELIVERY MANAGER X        │
    │   DELIVERY MANAGER Y        │
    │   DELIVERY MANAGER Z        │
    │             •               │
    │             •               │
    │             •               │
    └─────────────────────────────┘
```

*FIG 4*

TRANSPARENT COMBINATION OF INSTANT MESSAGE PROTOCOLS

CROSS-REFERENCE TO RELATED APPLICATIONS

This application is a Continuation in Part and claims priority from prior U.S. patent application Ser. No. 09/866,410, titled "Routing Instant Messages Using Configurable, Pluggable Delivery Managers" filed on May 25, 2001, the entire teachings of which are hereby incorporated by reference.

TECHNICAL FIELD

This invention relates, in general, to instant messaging, and in particular, to creating an environment where a user sees a uniform view of available users, with whom they may communicate using the instant messaging paradigm.

BACKGROUND OF THE INVENTION

In today's communication environments, instant messaging is commonplace. Users send messages to one or more intended recipients and expect that those messages will be delivered substantially instantly. Various mechanisms are used for instant messaging, including one or more instant messaging protocols, such as the SameTime protocol offered by International Business Machines Corporation or Instant Messenger offered by AOL. Other techniques are also used to send instant messages, such as pager gateways.

Although instant messaging is a common practice, frequently there are situations in which the message does not reach the intended recipient. For example, the messaging protocol is down or the intended recipient does not have access to the protocol sending the message (e.g., no computer access).

Thus, there is still a need for a capability that enhances the success rate with which an instant message reaches the intended recipient. A further need exists for an environment that is capable of providing a configurable and flexible delivery policy to be used to route messages to intended recipients.

Further, each instant message environment has its own interface that is unique to that protocol. In order to reach an intended recipient, a user must change the environment he is using in order to see the intended recipient.

Therefore a need exists to overcome the problems with the prior art as discussed above, and particularly for creating an environment where a user sees a uniform view of available users, with whom they may communicate using the instant messaging paradigm.

SUMMARY OF THE INVENTION

The shortcomings of the prior art are overcome and additional advantages are provided through the provision of a method and system for routing instant messages. The system and method use a user presence service to aid a user in determining to send an instant message to an intended recipient based on user availability information. The method also uses a configurable delivery manager that defines, at runtime, a delivery policy to be used to route the instant message to an intended recipient of the message. The delivery policy is based upon a configuration of the delivery manager, a user configuration of the intended recipient, a user presence service, and one or more available delivery mechanisms. The delivery manager is configured by means of an ordered list of one or more available delivery mechanisms. The delivery manager routes the instant message by dispatching the message by selecting sequential delivery mechanisms, in the order of appearance on the ordered list, until the user presence service indicates the intended recipient is available using the selected delivery mechanism.

System and computer program products corresponding to the above-summarized methods are also described and claimed herein.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts one example of an instant message, in accordance with an aspect of the present invention;

FIG. 4 depicts one embodiment of a delivery manager database, in accordance with an aspect of the present invention;

BEST MODE FOR CARRYING OUT THE INVENTION

In accordance with an aspect of the present invention, a messaging environment is provided, in which delivery managers (i.e., routing logic modules) are plugged in, dynamically configured at run-time, and used to control the routing of instant messages from users to intended recipients (e.g., other users). The delivery managers determine and apply delivery policies, which are based on user configurations, currently available delivery mechanisms, and the configuration of the delivery managers, to route the messages.

Figure 1:
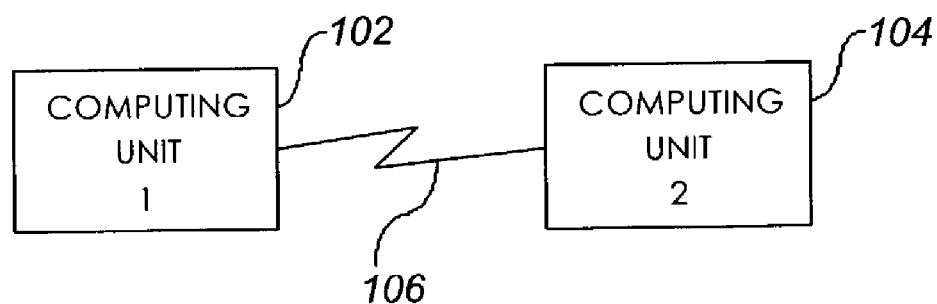
FIG. 1 depicts one embodiment of a computing environment incorporating and using aspects of the present invention.

One embodiment of a computing environment incorporating and using aspects of the present invention is depicted in FIG. 1. As depicted in FIG. 1, a computing environment 100 includes, for instance, at least one computing unit 102 coupled to at least one computing unit 104 via a connection 106. Each computing unit includes, for example, a personal computer, a workstation, a laptop computer, or any other type of computer. As one example, each unit is a personal computer based on the UNIX architecture. Further, the connection is a standard connection, such as any type of wire connection, token ring, or network connection, to name just a few examples. Alternatively, the connection is a communications channel, which may include one or more servers.

Executing on at least one of the computing units (e.g., Computing Unit 1) are one or more client applications that wish to send instant messages to one or more intended recipients (such as, users on Computing Unit 2 or other computing units). The client applications run in a messaging environment, which supports multiple diverse delivery managers that are responsible for routing the messages.

In accordance with an aspect of the present invention, the delivery managers can be dynamically added and/or configured at runtime. Thus, the user can select at runtime which delivery manager to use and how it is to be configured for a particular message. The delivery manager then uses a delivery policy to control delivery of that message. The delivery policy is constrained by recipient configuration, delivery manager configuration, and available delivery mechanisms, as described below.

One embodiment of the logic associated with routing an instant message from a user to an intended recipient is described with reference to FIG. 2. This logic is executed by, for instance, a client application of a computing environment.

Figure 2:
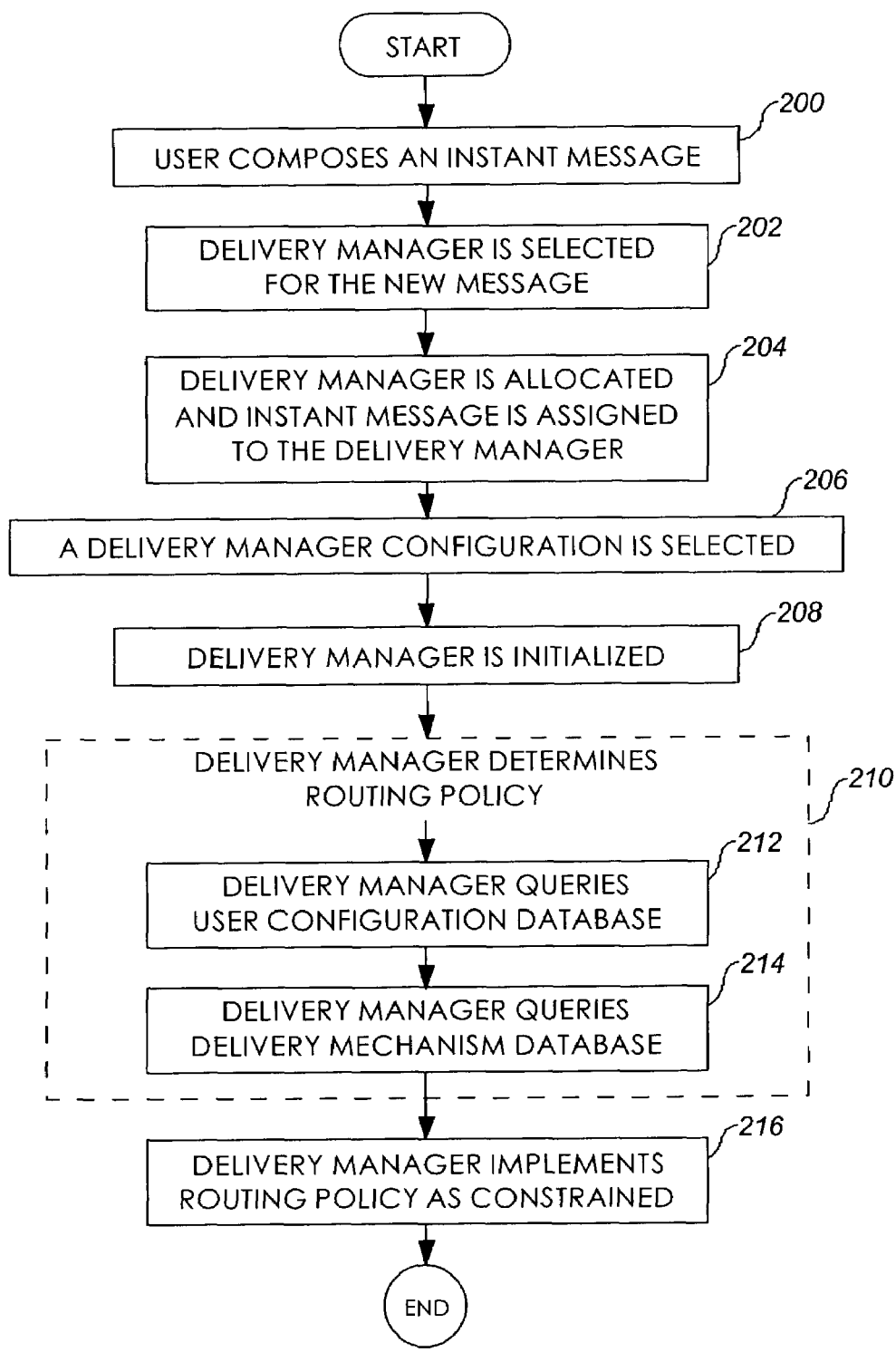
FIG. 2 depicts one embodiment of the logic associated with routing an instant message using a configurable and pluggable delivery manager, in accordance with an aspect of the present invention.

Referring to FIG. 2, initially, a user composes an instant message to be sent to the recipient, STEP 200. One example of such a message is depicted in FIG. 3. As shown, an instant message 300 includes, for instance, a user name 302 indicating the intended recipient of the message; a message body 304, including the message to be delivered to the intended recipient; and one or more optional properties 306. As one example, the properties include a variety of features, such as behavior (e.g., the priority of the message), an expiration date of when the message is to expire, and/or any other features, as desired.

Returning to FIG. 2, in addition to composing the message, a delivery manager, responsible for routing the particular message, is selected, STEP 202. For example, the client application presents a drop-down menu of a group of one or more available delivery managers, (e.g., available classes of delivery managers), and the user selects one of those managers. As a further example, the client application includes logic (e.g., a selection based on criteria, such as intended recipient, etc.) that selects a delivery manager from the group of available delivery managers.

The group of delivery managers is stored, for instance, within a database 400 (FIG. 4), which is accessible by the client application. That is, the database includes a list of available delivery managers. The delivery managers are pluggable and hot-swappable (e.g., can be added and/or changed at runtime). In particular, multiple implementations and functional variants of delivery managers may exist simultaneously and be dynamically added, removed or changed.

Referring again to FIG. 2, subsequent to selecting a particular class of delivery manager, an instance of the delivery manager is created and the message is assigned thereto, STEP 204. In the example presented herein, each message is assigned to its own delivery manager. However, in other embodiments, a delivery manager may service multiple messages.

Figure 5:
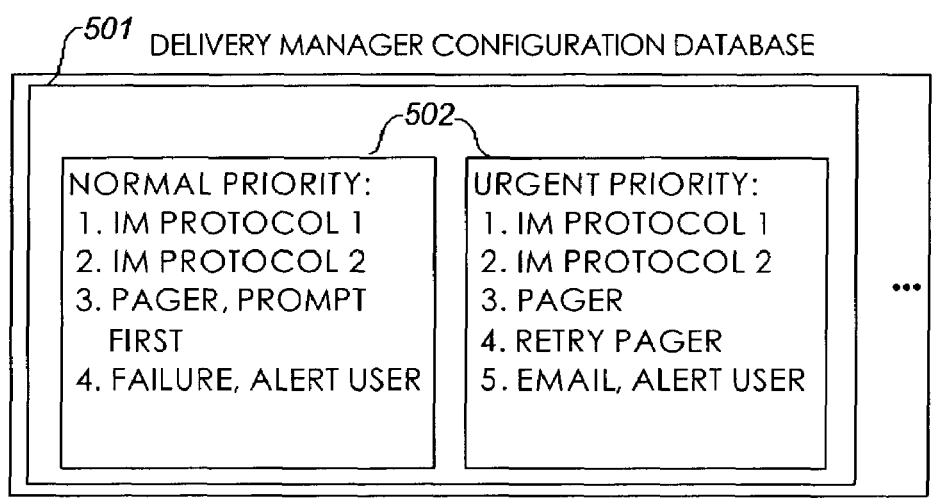
FIG. 5 depicts one example of a delivery manager configuration database, in accordance with an aspect of the present invention.

Thereafter, a configuration for the delivery manager is selected from, for instance, a delivery manager configuration database, STEP 206. An example of one such database is depicted in FIG. 5. As shown, a delivery manager configuration database 500 includes a configuration table 501 for each delivery manager. Configuration table 501 includes one or more delivery manager configurations 502 for its respective delivery manager. These configurations are used to dynamically configure the delivery manager, at runtime.

In one embodiment, the particular configuration for the chosen delivery manager is selected based on the content of the message. For example, a value of one of the properties, such as priority, is used to determine which configuration is selected. That is, if Priority=Normal (see 306 of FIG. 3), then the configuration for Normal Priority (see FIG. 5) is selected. Similarly, if Priority=Urgent, then the configuration for Urgent Priority is selected.

Subsequent to selecting a configuration for the delivery manager, the delivery manager is initialized with the selected configuration data, STEP 208 (FIG. 2). This dynamically configures the delivery manager, and the delivery manager is ready to begin message routing.

As an initial step of the routing process, the delivery manager defines a routing policy to be used to route the message to the intended recipient, STEP 210. One component of defining the policy includes querying, by the delivery manager, a user configuration database to determine how the intended recipient would like to receive the message, STEP 212.

Figure 6:
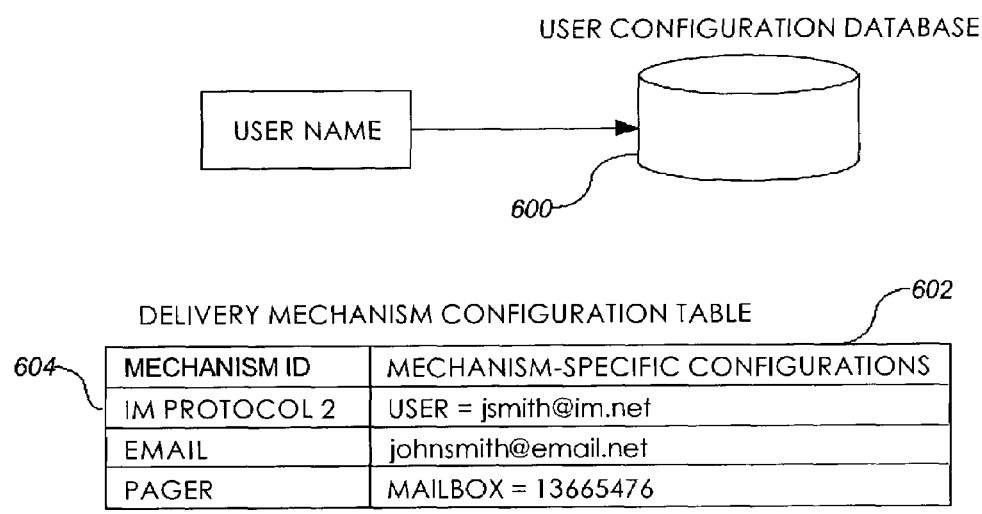
FIG. 6 depicts one embodiment of a user configuration database, in accordance with an aspect of the present invention.

One example of a user configuration database is depicted in FIG. 6. A user configuration database 600 includes a delivery mechanism table 602 for each valid message recipient. Each user's table includes configuration information 604 for one or more of the delivery mechanisms of the computing environment that are supported by that user. That is, each intended recipient is a logical user that has a presence at one or more logical locations, as defined by the table.

The configuration information includes an identification of each delivery mechanism supported by the user (e.g., Instant Messaging (IM) Protocol 2, Email, Pager), and mechanism-specific configurations. The mechanism-specific configurations include data, such as recipient login names on specific servers (e.g., user=jsmith@im.net, etc.), public keys for encrypted messaging protocols, etc.

The user name of the message is used as an index into the user configuration database to locate the table corresponding to that user. The delivery manager accesses the table to determine how the intended recipient desires to receive the message. In the example depicted in FIG. 6, the user name is John Smith, and the mechanisms for John Smith include: Instant Messaging Protocol 2, Email and Pager.

Returning to FIG. 2, in addition to querying the user configuration database to define a routing policy, the delivery manager also queries a Delivery Mechanism Database to determine the active delivery mechanisms of the computing environment, STEP 214. One example of such a database is depicted in FIG. 7.

Figure 7:
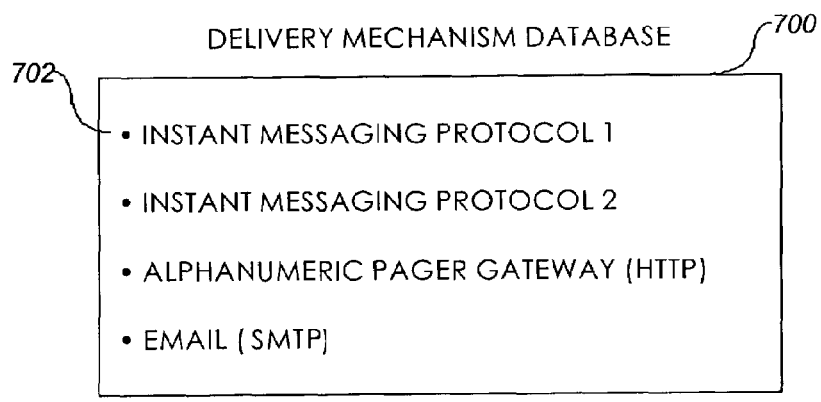
FIG. 7 depicts one example of a delivery mechanism database, in accordance with an aspect of the present invention.

As shown in FIG. 7, a Delivery Mechanism Database 700 includes one or more delivery mechanisms 702 currently capable of sending messages. This database is dynamically updated by, for instance, the client application to reflect the current operating environment.

The intersection of the delivery mechanisms of Delivery Mechanism Configuration Table 602 and the active delivery mechanisms of Delivery Mechanism Database 700 specifies the set of mechanisms available for routing the assigned instant message. For instance, in the particular example depicted herein, the set of mechanisms include Instant Messaging Protocol 2, Email and Pager. This set of mechanisms defines the routing policy to be used to route the message to the intended recipient.

The delivery manager implements the routing policy, as constrained, however, by its own configuration, STEP 216 (FIG. 2). (This constrained routing policy is referred to herein as the delivery policy.) For example, if the routing policy yields a set of mechanisms, which includes Instant Messaging Protocol 2, Email and Pager, but the delivery manager configuration does not include Email (see FIG. 5), then the delivery manager is limited to using Instant Messaging Protocol 2 and Pager.

The delivery manager applies the delivery policy to send the message to the intended recipient. In particular, the instant message is dispatched to one or more of the available delivery mechanisms of the delivery policy, serially or in parallel, as defined by the delivery policy. In this example, the delivery manager dispatches the instant message to Instant Messaging Protocol 2, and if the recipient is not available, then it initiates an alphanumeric page, after prompting the sender. This is indicated by the selected configuration (Normal Priority) of the delivery manager (see FIG. 5).

Figure 8:
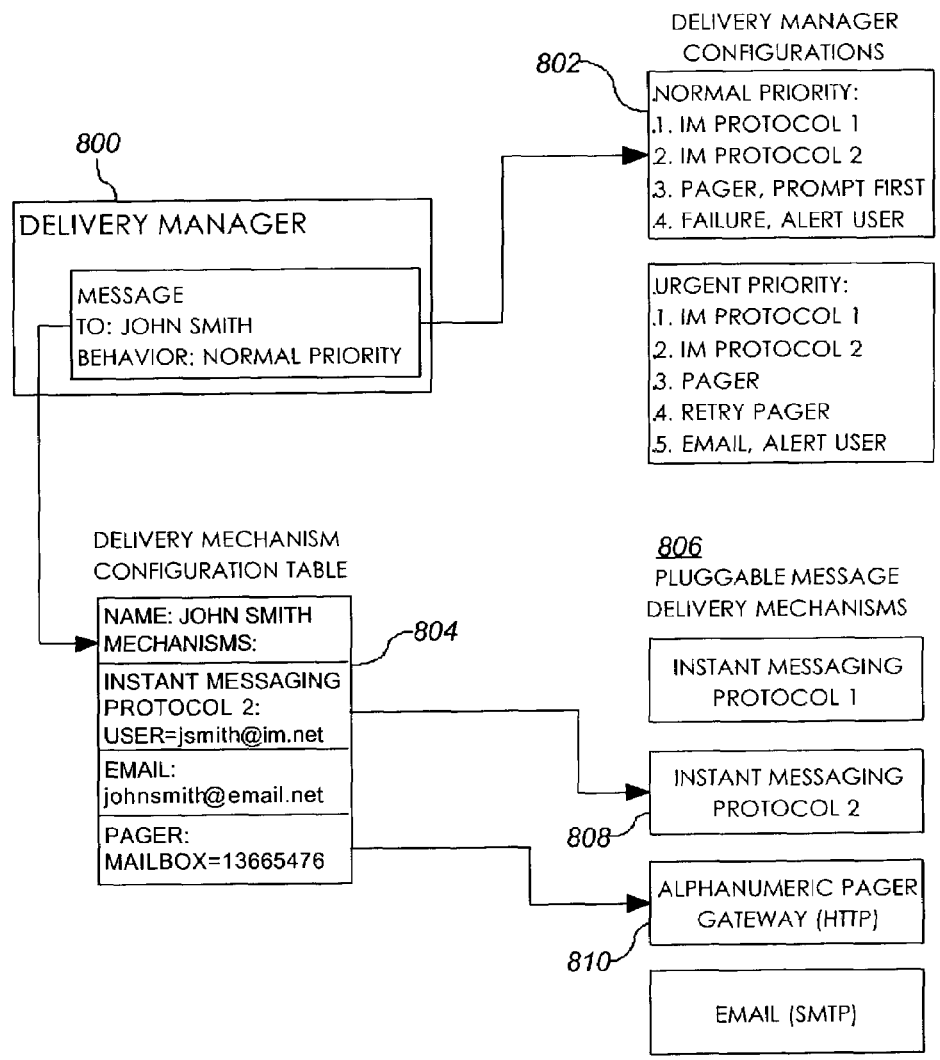
FIG. 8 depicts a particular routing example, which uses aspects of the present invention.

An overview of the particular example described herein is illustrated in FIG. 8. As shown, a selected delivery manager 800 is configured with Configuration 802. The delivery manager queries a Delivery Mechanism Configuration table 804 for John Smith and a Delivery Mechanisms Database 806 to define the routing policy to be used to send the message to John Smith. In this example, the routing policy includes Instant Messaging Protocol 2, Alphanumeric Pager, and Email. The routing policy, however, is constrained by configuration 802. That is, the delivery manager cannot use a mechanism that is not available to the delivery manager. Thus, the delivery manager defines a delivery policy, which is the routing policy constrained by configuration 802. In this example, the delivery policy includes Instant Messaging Protocol 2 (808) and Pager (810).

The delivery manager then uses one or more of the mechanisms of the delivery policy to route the message to John Smith. The manner in which these mechanisms are used is defined by configuration 802. Thus, in this example, the message is first sent by Instant Messaging Protocol 2, and then by pager, after prompting the sender.

Figure 9:
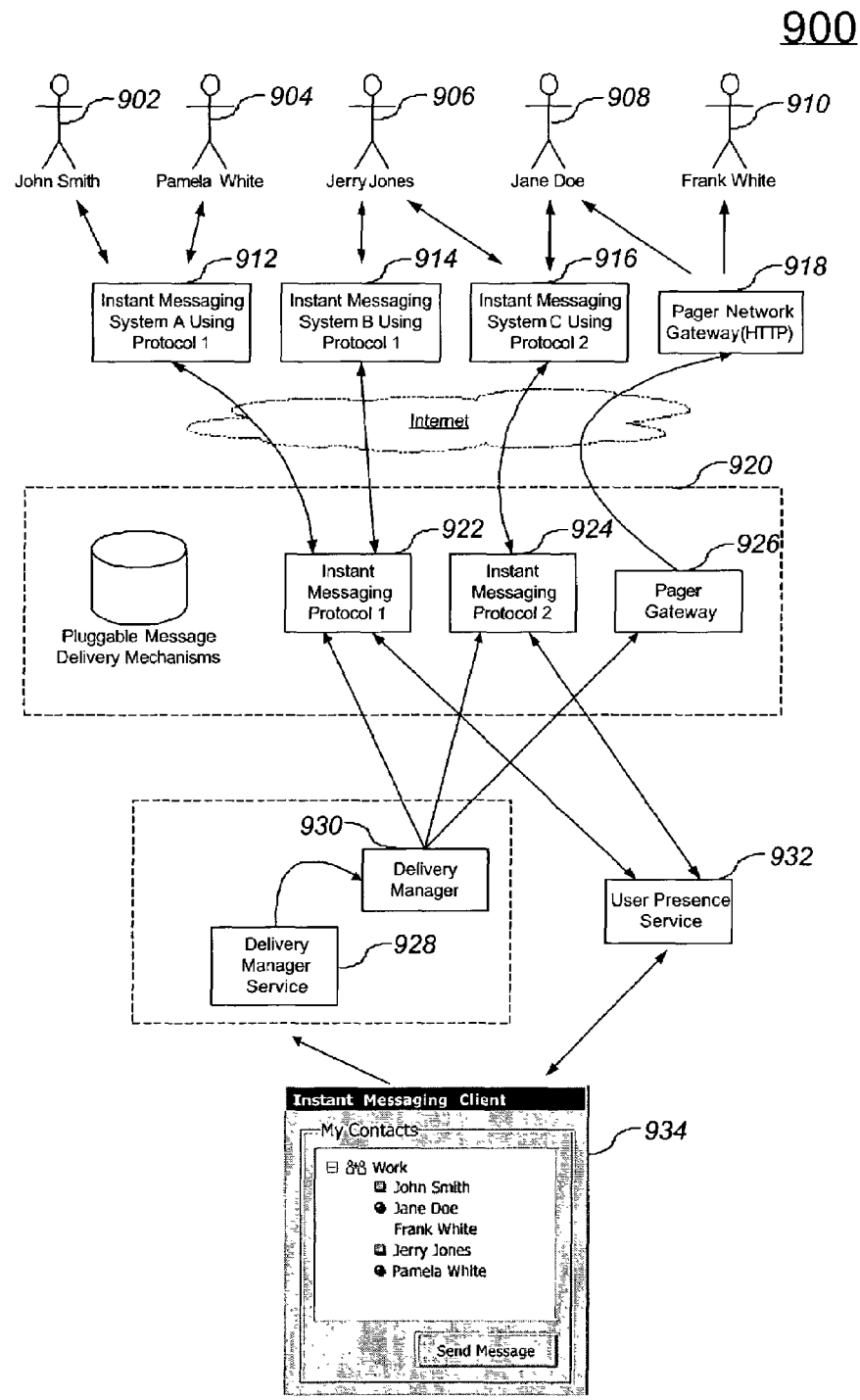
FIG. 9 depicts an end-to-end system, which uses aspects of the present invention.

A preferred embodiment of a complete end-to-end instant messaging system is depicted in FIG. 9. A User Presence Service 932 is used in combination with a configurable, pluggable delivery manager service 928, and a user interface 934 to route instant messages. In the exemplary system of FIG. 9, the user has five possible contacts: John Smith 902, Pamela White 904, Jerry Jones 906, Jane Doe 908, and Frank White 910. A list of these contacts appears in the user interface 934.

One embodiment of the logic associated with detecting and displaying the presence of users is described with reference to FIG. 10. This logic may be executed by a User presence Service 932 located on a client computer system or a centralized server. The User Presence Service 932 may preferably be a "super" database system that is updated from affiliated instant messaging systems (such as AOL, Lotus SameTime, etc.) via a two-way application programming interface (API) for events such as:
 1) user logins
 2) user logouts
 3) user out of availability conditions such as:
    a) out of service area for mobiles
    b) private time by recipients
       (e.g. "out-to-lunch")
    c) time-out of user interaction.

Figure 10:
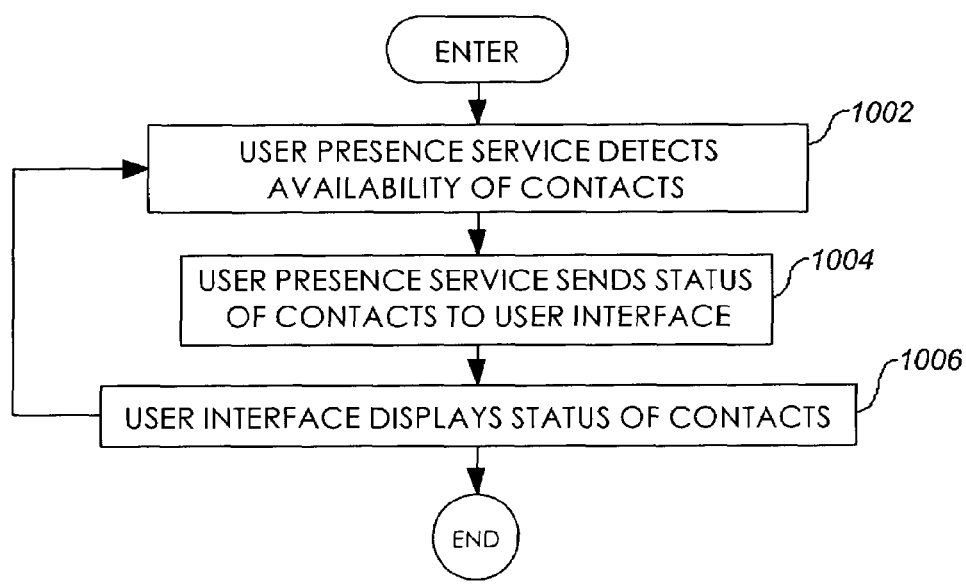
FIG. 10 depicts an embodiment of the logic associated with detecting and displaying the presence of users in accordance with an aspect of the present invention.

Referring to FIG. 10, at step 1002, the User Presence Service 932 detects the availability of contacts listed in the user configuration database 600. Then the User Presence Service 932, at step 1004, sends the status of each contact to the user interface 934 via a two-way API. At step 1006, the user interface 934 displays the status of each recipient. The steps described in FIG. 10 make up a continually running procedure, with updates being relayed to the user interface at all times.

In the exemplary system of FIG. 9, the status is relayed by means of a simple legend. A green box next to the name of "John Smith" indicates user John Smith 902 is online and available. A red circle beside "Jane Doe" indicates that user Jane Doe 904 is online, but may not be immediately available (e.g. her status may be "out to lunch"). The absence of any symbol beside the name "Frank White" indicates that no status information is available for user Frank White 910, but he may be reachable via certain delivery mechanisms (such as a pager gateway 926). The user presence service 932 is used as an aid to assist the user in determining the success rate of the message delivery. The user may use this feedback concerning the availability of his contacts to determine if he wishes to initiate an instant message to a certain recipient. Although the present example describes a particular manner of indicating availability, the invention is not limited to this method. Any method that conveys the status of recipients is applicable, such as text, symbols, highlighting, or color or font differentiation.

Figure 11:
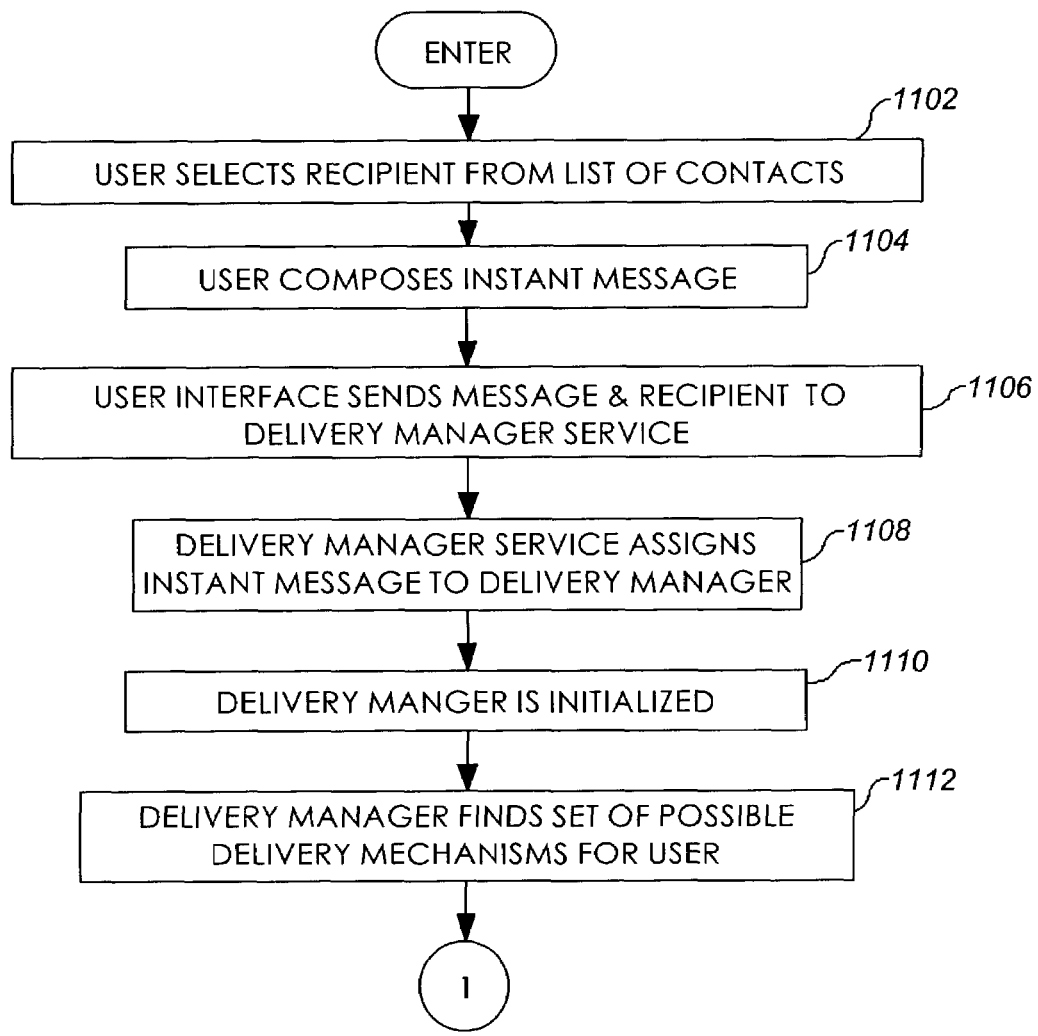
FIGS. 11 and 12 depict an embodiment of the logic associated with routing an instant message using a configurable and pluggable delivery manager, in combination with a user presence service in accordance with an aspect of the present invention.

A simple embodiment of the logic associated with routing an instant message using a configurable and pluggable delivery manager 930, in combination with a user presence service 932 is described with reference to FIG. 11. The send message operation begins at step 1102 wherein the user selects a recipient from a list of contacts displayed in the user interface 934. At step 1104, the user composes the instant message. The message and name of the recipient is then sent, via the user interface 934 to the delivery manager service 928 at step 1106. Next, at step 1108, the delivery manager service 928 assigns the instant message to a particular delivery manager 930. The delivery manager 930 is configurable by providing an ordered list of delivery mechanisms 920. After selecting the delivery manager 930, the delivery manager 930 is initialized with the selected configuration data at STEP 1110. The delivery manager then finds a set of possible delivery mechanisms 920 for the intended recipient, at step 1112, by checking a user configuration database.

Figure 12:
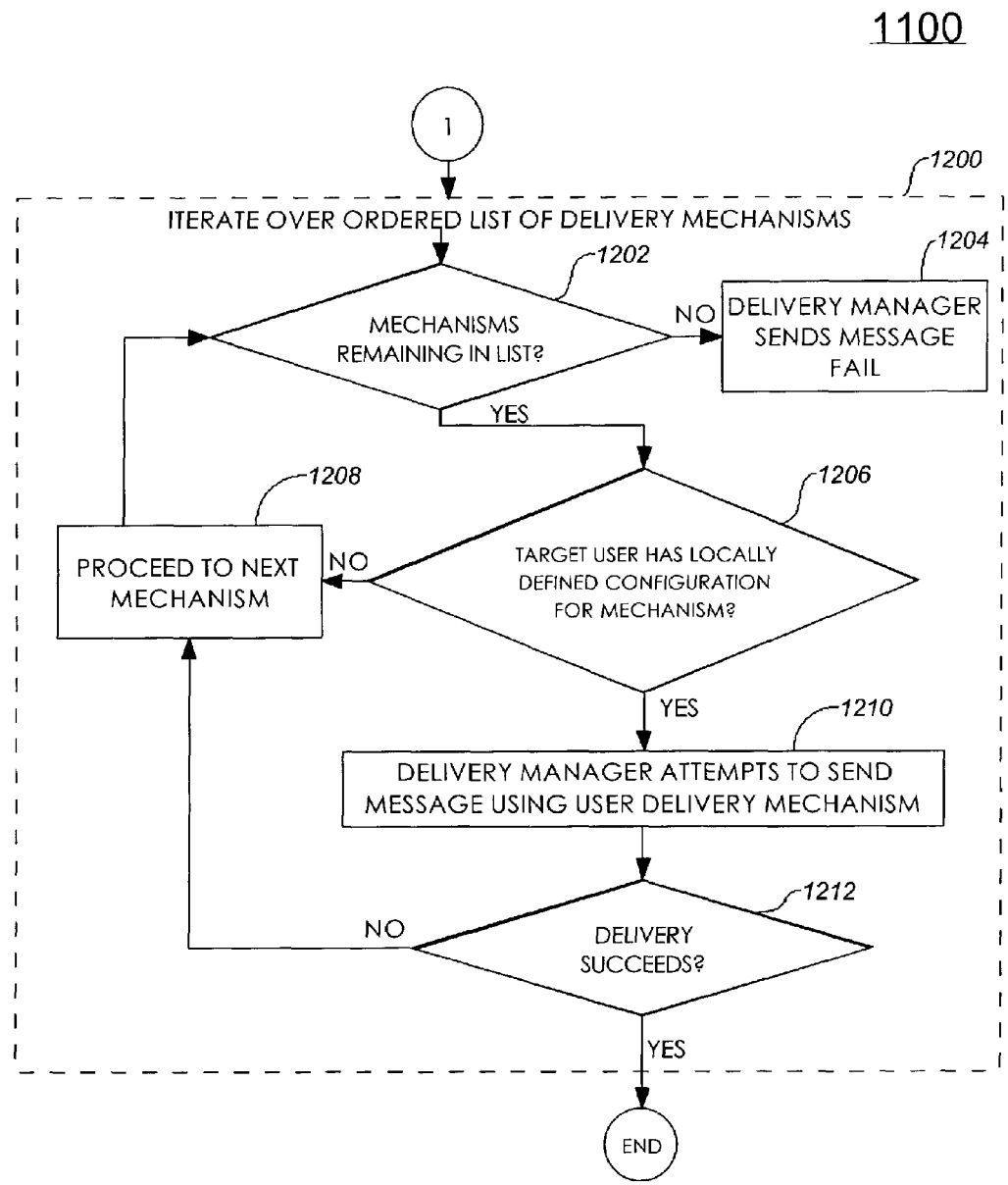

Continuing to FIG. 12, the delivery manager 930 then begins the process of routing the instant message to the intended recipient at step 1200. The delivery manager 930 checks to see if there are any delivery mechanisms 920 remaining in the sequentially ordered list, at step 1202. If all the available delivery mechanisms have been attempted, the delivery manager 930 will notify the user, in step 1204, that the routing has failed. If there are delivery mechanisms 920 remaining, the delivery manager 930 checks, at step 1206, to see if the targeted recipient has a locally defined configuration for the next mechanism in the ordered list. If the next delivery mechanism 920 in the ordered list is not present in the intended recipient's user configuration, the delivery manager 930 will proceed to the next delivery mechanism 920 on the ordered list at step 1208. If the delivery mechanism 920 is in the recipient's configuration, the delivery manager 930 attempts to send the instant message using this delivery mechanism at step 1210. If the delivery is successful, (i.e. the delivery manager 930 does not immediately receive a failed delivery notification) at step 1212, no further action is taken. Otherwise, the delivery manager 930 will continue going down the list of possible delivery mechanisms 920, at step 1208, and sending the message until the message is successfully routed or all delivery mechanisms 920 have been tried.

For example, referring again to the system of FIG. 9, using the method described above, user Jerry Jones 906 is available on Instant Message System B 914 using Protocol 1, and is also available on Instant Message System C 916 using Protocol 2. The square beside the name "Jerry Jones" in the Contact List of the user interface 934 indicates that Jerry Jones 906 is indeed available. When an instant message is composed having Jerry Jones 906 as the recipient, the delivery manager 930 will attempt to use the first available delivery mechanism 920, which, in this case, happens to be Instant Messaging Protocol 1 922. Since Jerry Jones 906 is available using protocol 1, the message will be successfully delivered and the send message operation is completed. However, if the message were intended for Jane Doe 908, who is available at Instant Message System C 916 using Protocol 2 and through the Pager Gateway 918, when an instant message is sent, the delivery manager will first attempt to use delivery mechanism Instant Messaging Protocol 1 922. When the user presence service 932 determines that Jane Doe 908 is not available using protocol 1, the delivery manager 930 will be instructed to attempt the next delivery mechanism 920, which is Instant Messaging Protocol 2 924. Since Jane Doe 908 is available using protocol 2, but not necessarily reachable at the moment (as indicated by the red dot beside her name in the user interface 934), the delivery will be deemed successful, with the understanding that it may be a while before the intended user actually reads the message. To successfully reach user Frank White 910, who is only available through the Pager Network Gateway 918, the delivery manager 930 will have to go through one more iterations and send the message through the last available delivery mechanism 920, the Pager Gateway 926.

Although particular examples are described above, the invention is not limited to such example. For example, additional and/or different delivery managers and/or delivery manager configurations are possible. Further, different recipients may have additional and/or different delivery mechanisms available to them. Also, at various times, additional and/or different message delivery mechanisms may be available.

Described in detail above is a pluggable, agent-driven, constraint-based instant messaging delivery environment. The delivery environment integrates multiple protocols and notification services to assist in providing a more robust, intelligent technique of synchronous communication. The environment provides robust message delivery by automatically leveraging and dynamically configuring many services simultaneously to reliably deliver instant messaging to the recipient. When a user (e.g., one logical user) composes a message and dispatches it to one or more intended recipients (e.g., one or more other logical users on the same or different computing units), the system assigns it to a delivery manager. The delivery manager is an agent that assumes responsibility for routing the logical content of the message to the recipient. Message recipients have corresponding profiles, which specify how they may be contacted via different delivery mechanisms or messaging services. A delivery manager agent adheres to a delivery policy, which includes a message routing algorithm paired with an agent-specific configuration.

In one aspect of the invention, both the delivery managers and the delivery mechanisms are pluggable and hot-swappable, meaning that multiple implementations or functional variants may exist simultaneously and be dynamically added or removed. Delivery mechanisms support a common set of instant messaging functionality, providing an abstraction over a wide variety of network protocols and notification services. Delivery managers support a common message routing interface, with each variant implementing different delivery policies. Delivery policies may utilize any of the delivery mechanisms available at the time a message is dispatched. Delivery managers are selected on a per-message basis, according to user configurations, such as message priority.

Advantageously, one or more aspects of the present invention provide higher rates of successful message delivery, as compared to state of the art instant messaging solutions; incorporate delivery mechanisms not typically associated with instant messaging clients (e.g., pagers, e-mail); provide users with fine-grained, accurate control over message routing behavior, without requiring interaction on a per-message basis; and support new message delivery mechanisms (pluggable system components) that may be implemented and distributed apart from the core system, which allows incremental refinements and extensions. The client-side delivery managers efficiently route messages by applying these constraints based on the current operating environment and individual message requirements.

The above-described computing environment and/or computing units are only offered as examples. The present invention can be incorporated and used with many types of computing units, computers, processors, nodes, systems, workstations, and/or environments without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of routing instant messages, the method comprising:
   determining to send an instant message to an intended recipient based on user recipient availability information provided by a user recipient presence service;
   defining, at runtime by a configurable delivery manager, a delivery policy to be used to route an instant message to an intended recipient of the instant message, wherein the delivery policy is based upon a configuration of the delivery manager, a user configuration of the intended recipient, and one or more available delivery mechanisms;
   displaying to a user sender, through a user interface, the user recipient availability information and while not contemporaneously displaying through the user interface any delivery mechanisms associated with the intended recipient, wherein the displaying allows for a user to select a user recipient for sending an instant message to and wherein a delivery policy is then defined for the selected user recipient; and
   routing the instant message to the intended recipient using the delivery policy.

2. The method of claim 1, wherein the configurable delivery manager is configured by means of an ordered list of one or more available delivery mechanisms.

3. The method of claim 2, wherein the defining of the delivery policy comprises:
   determining, from the user configuration, one or more delivery mechanisms supported by the intended recipient;
   determining which of the one or more delivery mechanisms supported by the intended recipient are included in the one or more available delivery mechanisms to yield one or more possible delivery mechanisms;
   determining which of the one or more possible delivery mechanisms are supported by the configurable delivery manager, as indicated in the configuration of the delivery manager; and
   determining a sequential order of the one or more supported delivery mechanisms, as indicated in the configuration of the delivery manager, a result of which defines the delivery policy.

4. The method of claim 3, wherein the routing comprises dispatching the instant message to at least one delivery mechanism of the delivery policy, as indicated by the delivery policy.

5. The method of claim 4, wherein the routing further comprises verifying a successful delivery of the instant message to the intended recipient according to the at least one delivery mechanism of the delivery policy.

6. The method of claim 5, wherein the routing further comprises dispatching the instant message to a next delivery mechanism of the sequential order of one or more available delivery mechanisms, as indicated by the delivery policy.

7. The method of claim 5, wherein the routing further comprises notifying the user sender of a failed delivery attempt when all the available delivery mechanisms have been attempted.

8. A system of routing instant messages comprising:
   a configurable delivery manager associated with an ordered list of one or more delivery mechanisms supported by the configurable delivery manager;
   a first memory comprising a user configuration of an intended recipient, the user configuration comprising a list of one or more delivery mechanisms supported by the intended recipient;
   a delivery manager service, communicatively coupled to the configurable delivery manager and the first memory, for determining available delivery mechanisms supported by both the configurable delivery manager and the user configuration of an intended recipient;
   a second memory comprising one or more available delivery mechanisms communicatively coupled to the configurable delivery manager, for dispatching an instant message to an intended recipient;
   a user interface, communicatively coupled to the delivery manager service, for displaying an availability of the intended recipient while not contemporaneously displaying through the user interface any delivery mechanisms associated with the intended recipient, wherein the displaying allows for a user to select a user recipient for sending an instant message to and wherein a delivery policy is then defined for the selected user recipient, and for notifying the user sender of a failed delivery attempt when all the available delivery mechanisms have been attempted; and
   a user presence service, communicatively coupled to the user interface, for displaying availability of the intended recipient to the user sender.

9. A system of routing instant messages, the system comprising:
   means for determining to send an instant message to an intended recipient based on user availability information provided by a user recipient presence service, the user recipient presence service displaying the user recipient availability information to a user sender through a user interface while not contemporaneously displaying through the user interface any delivery mechanisms associated with the user recipient, wherein the displaying allows for a user to select a user recipient for sending an instant message to and wherein a delivery policy is then defined for the selected user recipient;
   means for defining, at runtime by a configurable delivery manager, a delivery policy to be used to route an instant message to an intended recipient of the instant message, wherein the delivery policy is based upon a configuration of the delivery manager, a user configuration of the intended recipient, and one or more available delivery mechanisms; and
   means for routing the instant message to the intended recipient using the delivery policy.

10. The system of claim 9, wherein the configurable delivery manager is configured by means of an ordered list of one or more available delivery mechanisms.

11. The system of claim 10, wherein the means for defining the delivery policy comprises:
    means for determining, from the user configuration of the intended recipient, one or more delivery mechanisms supported by the intended recipient;
    means for determining which of the one or more delivery mechanisms supported by the intended recipient are included in the one or more available delivery mechanisms to yield one or more possible delivery mechanisms;
    means for determining which of the one or more possible delivery mechanisms are supported by the configurable delivery manager, as indicated in the configuration of the delivery manager; and
    means for determining a sequential order of the one or more supported delivery mechanisms, as indicated in the configuration of the delivery manager, for defining the delivery policy.

12. The system of claim 11, wherein the means for routing comprises means for dispatching the instant message to at least one delivery mechanism of the delivery policy, as indicated by the delivery policy.

13. The system of claim 12, wherein the means for routing further comprises means for verifying a successful delivery of the instant message to the intended recipient according to the at least one delivery mechanism of the delivery policy.

14. The system of claim 13, wherein the means for routing further comprises means for dispatching the instant message to a next delivery mechanism of the sequential order of one or more available delivery mechanisms, as indicated by the delivery policy.

15. The method of claim 14, wherein the means for routing further comprises means for notifying the user sender of a failed delivery attempt when all the available delivery mechanisms have been attempted.

16. A computer readable medium comprising instructions for routing instant messages, the instructions comprising:
   determining to send an instant message to an intended recipient based on user recipient availability information provided by a user recipient presence service;
   defining, at runtime by a configurable delivery manager, a delivery policy to be used to route an instant message to an intended recipient of the instant message, wherein the delivery policy is based upon a configuration of the delivery manager, a user configuration of the intended recipient, and one or more available delivery mechanisms;
   displaying to a user sender, through a user interface, the user recipient availability information and while not contemporaneously displaying through the user interface any delivery mechanisms associated with the intended recipient, wherein the displaying allows for a user to select a user recipient for sending an instant message to and wherein a delivery policy is then defined for the selected user recipient; and
   routing the instant message to the intended recipient using the delivery policy.

17. The computer readable medium of claim 16, wherein the configurable delivery manager is configured by means of an ordered list of one or more available delivery mechanisms.

18. The computer readable medium of claim 17, wherein the defining of the delivery policy comprises instructions for:
   determining, from the user configuration, one or more delivery mechanisms supported by the intended recipient;
   determining which of the one or more delivery mechanisms supported by the intended recipient are included in the one or more available delivery mechanisms to yield one or more possible delivery mechanisms;
   determining which of the one or more possible delivery mechanisms are supported by the configurable delivery manager, as indicated in the configuration of the delivery manager; and
   determining a sequential order of the one or more supported delivery mechanisms, as indicated in the configuration of the delivery manager, a result of which defines the delivery policy.

19. The computer readable medium of claim 18, wherein the routing comprises dispatching the instant message to at least one delivery mechanism of the delivery policy, as indicated by the delivery policy.

20. The computer readable medium of claim 19, wherein the routing further comprises verifying a successful delivery of the instant message to the intended recipient according to the at least one delivery mechanism of the delivery policy.

21. The computer readable medium of claim 20, wherein the routing further comprises dispatching the instant message to a next delivery mechanism of the sequential order of one or more available delivery mechanisms, as indicated by the delivery policy.

22. The computer readable medium of claim 21, wherein the routing further comprises notifying the user sender of a failed delivery attempt when all the available delivery mechanisms have been attempted.

* * * * *